April 19, 1932.  J. R. JOHNSON  1,854,699
DIRECTIONAL SIGNAL FOR VEHICLES
Filed Aug. 21, 1928  2 Sheets-Sheet 1
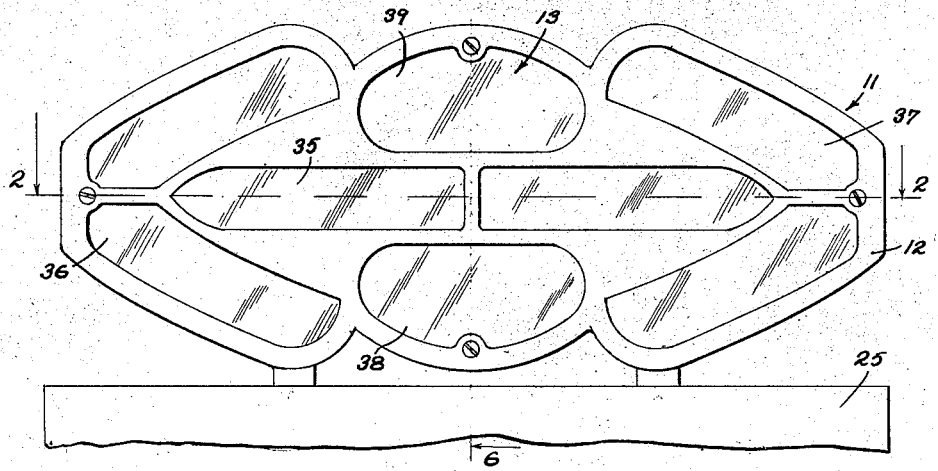
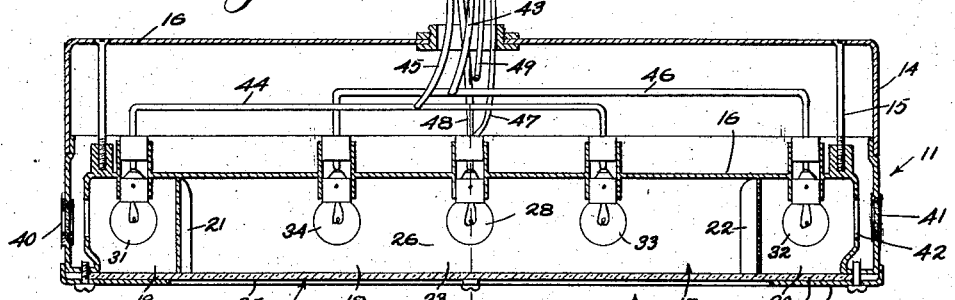
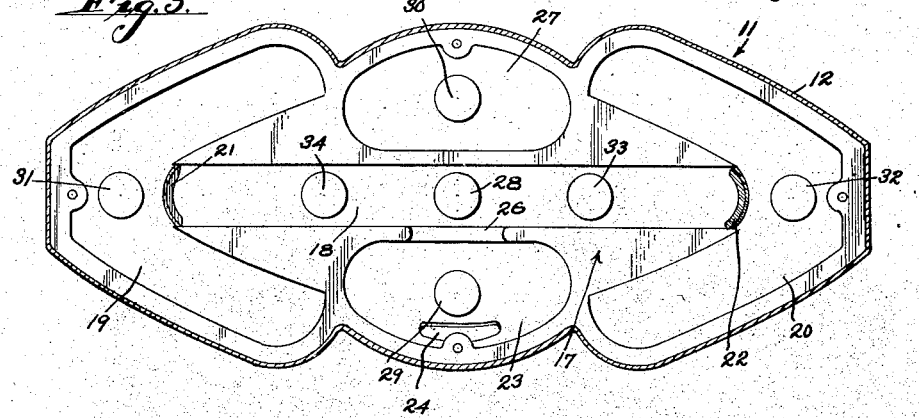
Inventor
Junius R. Johnson
by Hazard and Miller
Attorneys April 19, 1932. J. R. JOHNSON 1,854,699
DIRECTIONAL SIGNAL FOR VEHICLES
Filed Aug. 21, 1928 2 Sheets-Sheet 2
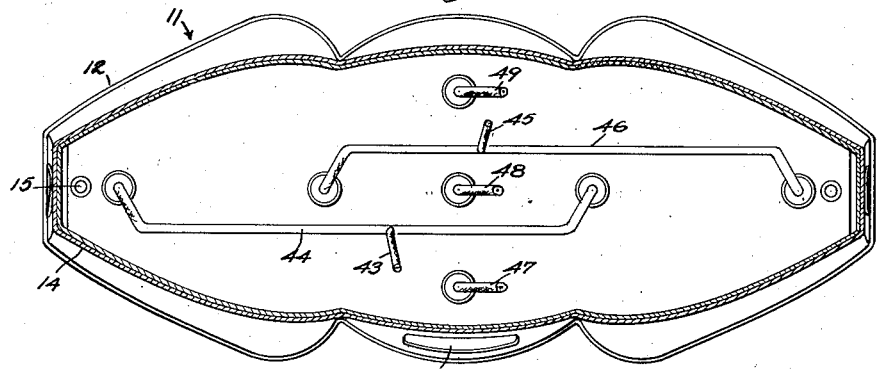
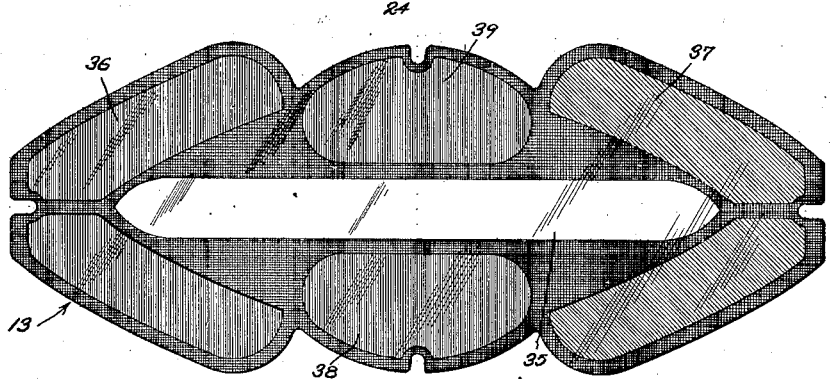
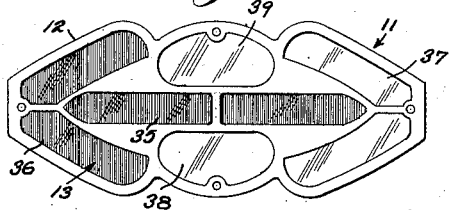
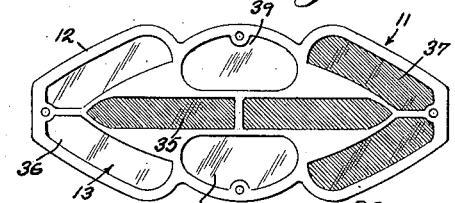
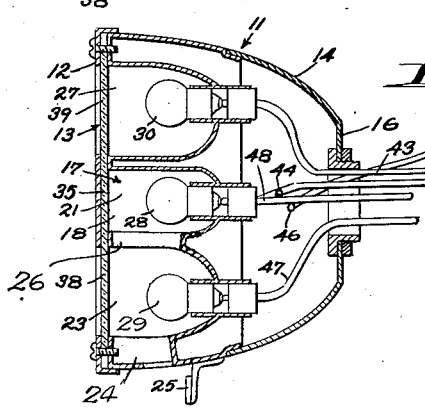
Inventor
Junius R. Johnson
by Hazard and Miller
Attorneys.

Patented Apr. 19, 1932

1,854,699

UNITED STATES PATENT OFFICE

JUNIUS R. JOHNSON, OF REDLANDS, CALIFORNIA

DIRECTIONAL SIGNAL FOR VEHICLES

Application filed August 21, 1928. Serial No. 301,058.

My invention is a direction signal for vehicles giving signals by use of illuminating lamps and pointing arrows.

An object of my invention is the construction of a signal box or housing having a plurality of lamps therein and with various compartments for the lamps so that a series of distinct and different signals may be given in accordance with the lamps which are illuminated. My invention also comprehends the use of colored lenses or glasses for the different compartments as well as other compartments having clear glass, the clear glass compartments being adapted to operate in conjunction with those having the colored glass by using colored lamps under the clear glass.

Another object of my invention is the construction of a signal box or the like having an arrow-type of direction signal for right and left turns, in which the stem of the arrow is common to both of the turns; that is, the stem has arrow heads on each end, either of which may be illuminated in conjunction with the stem and, for instance, the head at one end and stem may be illuminated with one color such as red for a turn in a certain direction, and for the turn in the opposite direction the opposite head and the stem may be illuminated with another color such as green. In this connection a feature of my invention is having the arrows formed by one compartment in the holder having a series of lamp bulbs mounted therein giving different colored illuminations for the stem of the arrow and utilizing the colored lenses for the heads of the arrows. Also the compartment is provided with windows having colored glass to transmit light of the desired color from the bulbs in the arrow heads to the stem.

Another object of my invention is a construction utilizing the arrow stem as a backing signal or illumination and, if desired, to have this faintly illuminated at all times by the tail light lamp, thus indicating to following drivers the place to look for direction signals.

In constructing my invention I utilize a housing or other suitable structure having a signal compartment forming an arrow stem with heads at each end, and at the junction of the stem and the heads I have windows of colored glass. The stem has a single clear lamp bulb and there are clear glass bulbs in each of the arrow heads in alignment with the stem to shine through the colored glasses of the arrow heads and the colored windows into the stem. The stem has a clear glass cover and has two colored lamp bulbs therein, each bulb being of a similar color to that of one of the windows and remote from the window of a similar color. In the central portion of the device and at the bottom I have a compartment for a clear lamp bulb having preferably a red lens and forming a tail light with an aperture to project light downwardly onto a license plate. Positioned centrally above the stem I have a compartment with a clear glass bulb therein and a suitable colored lens forming a stop light signal. The wiring may be of any suitable character and suitable switches utilized, the latter forming no part of my invention. The housing also has lenses at opposite ends of the structure giving a side illumination from the bulbs in the arrow heads, these lenses being suitably colored.

My invention is illustrated in the accompanying drawings, in which:

Fig. 1 is an elevation taken in the direction of the arrow 1 of Fig. 2,

Fig. 2 is a longitudinal horizontal section on the line 2—2 of Fig. 1 in the direction of the arrows, Fig. 3 is an elevation of the interior of the housing with the face plate and lenses removed, Fig. 4 is a rear view with the back cover removed showing the wiring, Fig. 5 is an elevation of the face plate showing the lenses, Fig. 6 is a vertical transverse section on the line 6—6 of Fig. 2 in the direction of the arrows, Fig. 7 is an elevation of the signal showing a left-hand turn signal, Fig. 8 is a similar elevation showing a right-hand turn signal, Fig. 9 is a wiring diagram.

In constructing my invention I have a suitable housing 11 provided with a cover plate 12 having glass covers or lenses designated generally by the numeral 13 therein, and with a back cover plate 14 secured by bolts 15 or the like to a back plate 16 of the housing. It is to be understood that this housing may be made in any suitable manner and not necessarily limited to that illustrated in the drawings.

The housing has a main compartment 17 having a longitudinal cross portion 18 to form an arrow stem and having marginal portions 19 and 20 formed in the shape of arrow heads. At each end of the stem there are windows 21 and 22 of colored glass, thus separating the stem from the opposite arrow heads.

In the middle and the lower part of the housing there is another compartment 23 for a tail light signal, this having an opening 24 at the bottom so that the light may shine on a license plate 25 suspended below the housing. There is also preferably an opening 26 between the compartment 23 and the central portion 18 forming the stem of the arrow. Directly above the tail light compartment there is another compartment 27 forming a stop light lamp compartment.

In these various compartments I have a clear lamp 28 in the center of the arrow head stem compartment 18 and a clear globe 29 in the tail light compartment 23. A clear globe 30 is placed in the stop light compartment 27 and there are also clear globes 31 and 32 in the arrow heads 19 and 20 in alignment with the stem compartment 18. A colored lamp 33 is positioned in the stem compartment 18 of the same color as the window 21, and the lamp 34 is also of the same color as the window 22.

The glass covers or lenses are preferably arranged as follows, reference being directed particularly to Fig. 5: In this case an elongated central glass 35 is formed of clear or ground glass and covers the stem compartment 18 of the arrow. The arrow head glass or lens 36 is colored and indicated as red. The opposite arrow head 37 is also colored and indicated as green. The window 21 corresponds in color to the glass 36 and would be red, the window 22 corresponding to the glass 37 and would be colored green. Therefore, the lamp 33 would be red and the lamp 34 would be green, in the instance given. The tail light glass 38 is preferably red to conform to the legal requirements, and the stop light glass 39 may be red, amber or any other suitable color.

The ends of the housing are provided with glasses or lenses 40 and 41, there being openings 42 in the inner structure of the housing to allow transmission of light from the end lamps 31 and 32 through the lenses 40 and 41.

The wiring connection is indicated particularly in Figs. 2 and 4, in which it will be seen that there is a lead wire 43 connected by branches 44 to the lamps 31 and 33, all of the lamps being grounded. Another lead wire 45 connects by the branches 46 to the lamps 34 and 32. A lead 47 connects to the tail-light lamp 29. A lead 48 connects to the backing light 28 and a lead 49 connects to the stop light lamp 30.

The manner of functioning of my invention is substantially as follows, reference being directed particularly to Figs. 7 and 8:
In normal night running the tail-light lamp 29 having the clear globe is illuminated and transmits a red light through the glass 38 rearwardly and also throws light downwardly through the opening 24 onto the license plate 25. A certain amount of this light also passes through the opening 26 into the stem compartment 18 of the arrow and gives this a faint white illumination merely sufficient to show a person where the signal lights are on the housing and on the automobile. In giving the slow or stop signal the lamp 30 is illuminated transmitting a red or other suitable light through the colored glass 39. If a person wishes to back, the light 28 is illuminated, which, on account of the rear glass 35 in the stem portion of the arrow, gives a white light which, depending on the strength of the bulb, may be sufficient to illuminate the roadway back of the vehicle. In giving a left-hand turn signal the operator controls the lamps so that the current is transmitted through the lead 43 and thence to the clear bulb 31 and to the colored bulb 33. The clear bulb gives a red light through the red glass 36 of the arrow head and also transmits a red light through the red window 21 to the stem 18 showing a red illumination for part of this stem. The opposite end of the stem is illuminated by the red colored bulb 33. These colors for the left-hand turn signal are indicated in Fig. 7. To give a right-hand turn signal the operator controls a switch transmitting current through the wires 45 and 46 to the clear lamp 32 and to the colored lamp 34 indicated as green. Therefore, the arrow pointing to the right has a green illumination from the lamp 34 and from the green colored light transmitted through the window 22 to the stem, and by the green colored glass 37 over the compartment 20, this arrow showing as illustrated in Fig. 8. It will thus be seen that these two opposite directional signals may be given, utilizing but four lamps and having the stem of the arrows common to both signals, but illuminated the same color as the head of the arrow for each of the signals.

When it is desired to install my signal on the front of a vehicle the front license plate can also be illuminated if desired, and the lens 38 may be white. As in most states red lights can not be used on the front of a vehicle except for special purposes, such as police and ambulance, the glasses indicated as red are changed to other suitable colors. Otherwise the signals are given in the same manner, and manifestly the wiring is connected so that the switches will control both the signals on the front and rear of a vehicle in the same manner.

In Fig. 6 is illustrated the wiring diagram in which I provide the supply lines 50 and 51 of which line 51 is indicated as being grounded. The tail light 29 has a lead 47 with a switch 52 therein, this switch making a connection with the lead 50 so that by closing the switch 52 the tail light is always illuminated. The stop light 30 is connected by the lead 49 to a contact 53 and may be engaged by a moving switch 54 which is indicated as connected to the supply lead 50. The backing light 28 has a lead 48 which connects to the contact 55. Therefore, by moving the switch 54 this backing light may be illuminated. The lamps 31 and 33 in the arrow have leads 44 and 43 to the contact 56. The other lamps 34 and 32 of the other arrow have leads 46 and 45 to the contact 57. These contacts 56 or 57 may be closed by the switch lever 54 and thus close the circuit to either of the arrow signalling lamps.

In the specification and drawings where I have designated an arrow structure this is to be intended broadly as any type of a pointing or indicating device, and for convenience this has been illustrated as having a single stem with two V-shaped structures at the end, such structures pointing in opposite directions and forming, in effect, a conventional double-headed arrow. However, the tips of the V-shaped structures are spaced a considerable distance from the central stem as this gives greater visibility at further distances than in a solid arrow head shape.

From the standpoint of carrying and purchasing equipment, the driver need only essentially carry a supply of clear lamps, as, if one of his colored lights, for illuminating the stem, should give out, he would still have an effective signal from the illuminated arrow head given by a clear lamp. Therefore, from the practical standpoint, it is much better to have as few colored lamps as possible and obtain the color for signalling by the glass covers of different compartments.

Therefore in the claims where I have designated devices as being arrow heads or the equivalent, this is intended to cover any suitable pointer or pointing device on the common stem.

Various changes may be made in the principles of my invention without departing from the spirit thereof, as set forth in the description, drawings and claims.

I claim:

1. A direction signal having a housing with an elongated central compartment and an end compartment at each end thereof, the central and the end compartments being shaped to form a double headed arrow with the central compartment forming the stem and the end compartments the arrow heads, a colored glass forming a cover for each of the arrow head compartments, these being of different colors, and a window between the stem and each of the arrow heads, each window corresponding in color with the covering of the adjacent arrow head, a clear glass cover for the stem, a central clear lamp in the stem and two colored lamps on each side thereof, each lamp corresponding in color to the window and the arrow head covering remote therefrom, the arrow heads each having a clear glass lamp in alignment with the central compartment, electric circuits whereby the stem compartment alone may be illuminated by the clear lamp therein and give a white light or whereby the stem compartment and one of the arrow heads may transmit a colored light, such light corresponding to the color of the glass cover of such arrow head by the illumination of the lamp contained in such arrow head and the transmission of such light through the colored window adjacent thereto and also from the colored lamp in the stem remote from such window, or, vice versa, the arrow stem and the opposite arrow head may transmit a different color corresponding to the color of the glass covering of such latter arrow head and the colored window adjacent thereto transmitting light to the stem, and the stem also having the light from the colored lamp in such stem of the same color as the window and the arrow head covering remote therefrom.

2. A direction signal as claimed in claim 1, the housing having a fourth compartment adjacent the stem compartment with an opening to such stem compartment and having a colored glass thereon with a clear lamp in such latter compartment adapted to form a tail light whereby the light from such tail light, which is designed to be constantly burning, may transmit through the opening to the stem compartment.

3. A direction signal having a housing with compartments forming a double headed arrow, such compartments comprising an elongated central compartment with two end compartments shaped as arrow heads, a fourth compartment adjacent the stem compartment and having an opening to such stem compartment, the ends of the stem compartment having colored windows of a different color at each end and the adjacent arrow head compartments having a cover corresponding in color to the adjacent window, the stem compartment having a clear glass cover and the fourth compartment adjacent thereto for a tail light having a colored glass cover, the stem, the arrow heads, and the tail light compartments each having clear lamps, the lamps in the arrow heads being in alignment with the stem, the stem having two colored lamps, there being one lamp corresponding to the color of one of the windows and one of the arrow head covers and another lamp corresponding in color with the other arrow head and the other window, electric circuits whereby when the lamp in the tail light compartment is lit a colored light is transmitted from such tail light compartment and a clear white light is transmitted through the said opening into the arrow stem compartment and whereby the clear lamp in the arrow stem compartment may be illuminated to the exclusion of the colored lamps or the clear lamps in the arrow head compartments, such circuits also providing for the illumination of the clear lamps in either of the arrow heads and one of the colored lamps in the stem compartment, such latter lamp corresponding in color to the arrow head cover which is illuminated and the window to the arrow stem adjacent the said arrow head.

In testimony whereof I have signed my name to this specification.

JUNIUS R. JOHNSON.